United States Patent [19]
Hoffman

[11] 3,712,685
[45] Jan. 23, 1973

[54] DUAL CIRCUIT BRAKE VALVE
[75] Inventor: David A. Hoffman, Olmsted Falls, Ohio
[73] Assignee: Bendix-Westinghouse Automotive Air Brake Company, Elyria, Ohio
[22] Filed: Sept. 29, 1970
[21] Appl. No.: 76,489

[52] U.S. Cl. ..................303/52, 137/596.15, 303/13, 303/40, 303/54
[51] Int. Cl. ..............................................B60t 15/12
[58] Field of Search............303/40, 52, 53, 54, 2, 13, 303/14; 137/596.15

[56] References Cited
UNITED STATES PATENTS

| | | | |
|---|---|---|---|
| 3,232,316 | 2/1966 | Carlisle | 137/596.15 |
| 3,265,447 | 8/1966 | Bueler | 303/40 |
| 2,984,218 | 5/1961 | Christianson | 137/596.15 |

FOREIGN PATENTS OR APPLICATIONS

| | | | |
|---|---|---|---|
| 1,120,264 | 1/1955 | France | 303/53 |

*Primary Examiner*—Trygve M. Blix
*Assistant Examiner*—John J. McLaughlin
*Attorney*—Scrivener Parker, Scrivener & Clarke

[57] ABSTRACT

A dual circuit brake valve including first and second self-lapping valve elements for respectively controlling primary and secondary fluid pressure braking circuits, each of the valve elements being controlled by separate relay pistons subject to fluid pressure in one of said circuits and the supply of fluid pressure to the relay pistons being manually controlled through operation of a valve which is independent of the self-lapping valve elements.

10 Claims, 1 Drawing Figure

PATENTED JAN 23 1973
3,712,685
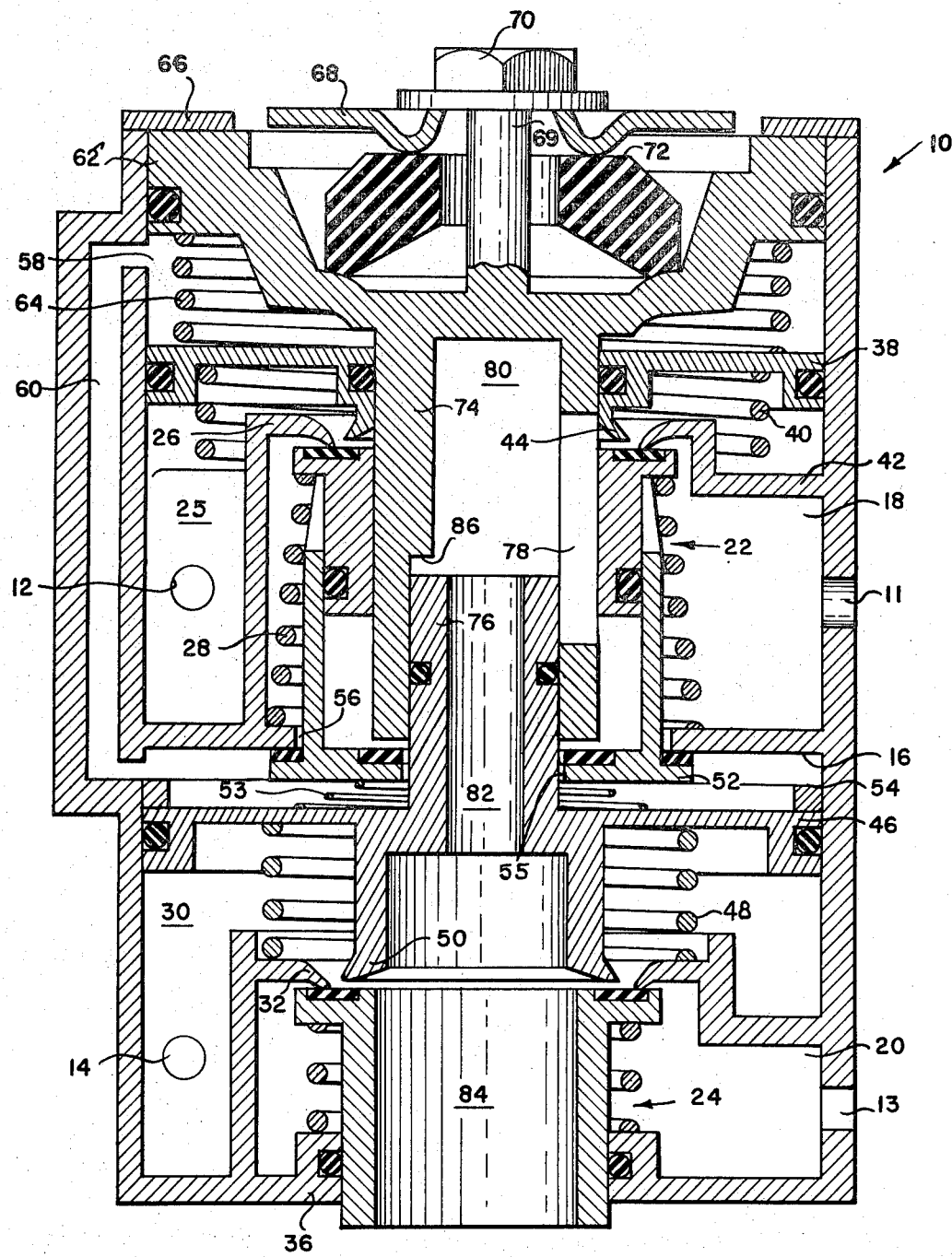
INVENTOR.
DAVID A. HOFFMAN
BY
Scrivener Parker Scrivener & Clarke
ATTORNEYS

DUAL CIRCUIT BRAKE VALVE

DESCRIPTION OF THE INVENTION

It has heretofore been proposed to utilize dual brake valves for separate primary and secondary vehicle braking systems, and such valves have included a pair of self-lapping valve elements controlled by the operator. An undesirable feature of the prior dual brake valves has been the inherent differential pressures in the primary and secondary circuits. Efforts to reduce this differential have resulted in valves of large size as well as a sacrifice in reliability. Even these attempts have not solved the problem of securing the delivery of substantially uniform pressures in the respective systems.

It is accordingly one of the objects of the present invention to provide a novel dual brake valve construction which is so constituted as to provide substantially uniform pressures in the primary and secondary braking systems, thereby overcoming the foregoing disadvantages.

Another object of the invention is to provide a dual brake valve which includes a novel arrangement of relay members for operating the respective control valves so that during actuation of the valve, substantially simultaneous operation of the valve elements takes place, thus eliminating for all practical purposes any pressure differential of the pressures delivered to the primary and secondary braking circuits.

A further object is to provide a dual brake valve of the foregoing character wherein the relay members are operated by fluid pressure from one of the supply circuits and the application of such fluid pressure to the relay members is controlled by a separate control valve which in turn is controlled by the usual manually operable member.

Other objects and novel features of the invention will appear more fully hereinafter from a consideration of the following detailed description when taken in connection with the accompanying drawing, the single FIGURE of which is a vertical cross sectional view of a dual brake valve embodying the features of the invention.

Referring to the drawing, a dual circuit brake valve embodying the principles of the present invention is illustrated therein as comprising a housing 10 having primary and secondary pairs of inlet and delivery ports 11, 12 and 13, 14, the respective inlet ports 11, 13 being adapted to be connected to independent fluid pressure supply sources, not shown, while the respective delivery ports 12, 14 are adapted to be connected to independent brake actuators. The interior of the housing 10 is divided by a centrally disposed partition 16 to form upper and lower chambers 18 and 20 respectively housing primary and secondary valve elements 22 and 24 for controlling the application of the fluid pressure to the delivery ports 12 and 14.

The upper chamber 18 forms the primary inlet chamber or cavity which is separated from a primary delivery cavity 25 by a valve seat 26 normally closed by the valve element 22 which latter is normally maintained in the position illustrated by a spring 28 confined between the partition 16 and the upper end of the valve element 22. In like manner, the lower chamber 20 forms the secondary inlet chamber or cavity which is separated from a secondary delivery cavity 30 by a valve seat 32 which is normally closed by the valve element 24 which latter is normally maintained in the position shown by a spring 34 confined between the lower end 36 of the housing 10 and the valve element 24.

In order to control the operation of the primary valve element 22, a primary fluid responsive relay element in the form of a piston 38 is slidably mounted in the upper portion of the housing 10 and is maintained in the position shown by means of a spring 40 confined between a wall 42 and the relay element. In such position, an exhaust valve element 44 is normally spaced from the valve element 22. In like manner, a secondary fluid responsive relay element in the form of a piston 46 is slidably mounted in the lower portion of the housing 10 for controlling the operation of the secondary valve element 24, the piston 46 being normally maintained in the position shown by means of a spring 48 confined between the valve seat 32 and the relay element. In such position, an exhaust valve element 50 is normally spaced from the valve element 24.

One of the important features of the present invention resides in the provision of manually operable means for substantially simultaneous controlling the application of fluid pressure from the respective inlets 11 and 13 to the respective relay elements 38 and 46 to effect substantially simultaneous operation of the valve elements 22 and 24 to the end that the fluid pressures delivered to the respective primary and secondary delivery ports 12 and 14 will be substantially equal. For this purpose, a third valve element element 52 is provided for controlling communication between the primary inlet cavity 18 and a secondary relay chamber 54 by way of a valve opening 56 formed in the partition 16. Valve element 52, when open, establishes communication between the primary inlet cavity 18 and a primary relay chamber 58 by way of the opening 56, a secondary relay chamber 54 and a passage 60 formed in the housing 10. Thus, with the third valve element 52 open, fluid pressure is simultaneously conducted from the primary inlet 11 to the primary and secondary relay chambers 58 and 54 so that the valves respectively controlled by the relay elements 38 and 46 may be substantially simultaneously operated. Valve element 52 is normally closed by a spring 53 interposed between the valve element and the secondary relay element 46.

Manually operable means are provided for operating the third valve element 52 and in the form shown, such means includes a graduating piston 62 which is normally maintained by a spring 64 in a position where the upper portion of the piston engages a stop plate 66 secured to the housing 10 in any suitable manner. Movement of the piston 62 is accomplished by a suitable brake pedal arrangement acting upon a disc 68 which is slidably secured to an upstanding stem 69 of piston 62 by a nut 70. A rubber graduating spring 72 is confined between the disc 68 and the piston 62 in the manner shown in the U.S. Pat. to Herbert A. Kemble No. 3,003,825 dated Oct. 10, 1961, and reference to such patent is made by a suitable pedal arrangement and the structure, mode of operation and advantages of the rubber graduating spring 72.

As shown, the graduating piston 62 is provided with an extension 74 having its lower end spaced a slight distance above the third valve element 52. Extension 74 forms a guide for an upstanding tubular part 76 of the secondary relay element 46 and the extension 74 is also provided with a slotted portion 78 to normally establish communication between the primary delivery chamber 25 and the atmosphere by way of open exhaust valve element 44 and aligned bores 80, 82 and 84. The extension 74 is also provided with a shoulder 86 for manually moving the secondary relay element 46 through engagement with the part 76 to open the secondary valve element 24 in the event of failure of fluid pressure at the primary inlet 11.

In operation, and with the parts in the normal position illustrated, manual operation of the brake pedal will move the graduating piston 62 downwardly a slight distance until the lower end of the extension 74 contacts the third valve element 52 to close exhaust opening 55. Continued movement opens valve opening 56 and as soon as this occurs, fluid pressure from the primary source will be conducted to the secondary relay chamber 54 by way of the primary inlet port 11, cavity 18 and valve opening 56. FLuid pressure will also be simultaneously conducted from the secondary relay chamber 54 to the primary relay chamber 58 through passage 60. Fluid pressure in the primary relay chamber 58 will then be effective upon the motive area of the primary relay element 38 to move the latter downwardly against the action of the spring 40 to first close the, exhaust valve element 44 and then move primary valve member 22 away from contact with the valve seat 26. Fluid pressure in the primary inlet cavity 18 will then be conducted past the open valve 22 to the primary deliver chamber 25 and thence to the primary braking system through the outlet port 12.

In like manner, fluid pressure admitted to the secondary relay chamber 54 will be effective upon the motive area of the secondary relay element 46 to move the latter downwardly against the tension of spring 48 to first close the exhaust valve element 50 and then move the secondary valve element 24 away from contact with the valve seat 32. Fluid pressure in the secondary inlet cavity 20 will then be conducted past the open valve 24 to the secondary delivery chamber 30 and thence to the secondary braking system through the outlet port 14.

It will be readily apparent from the above, that as soon as the third valve element 52 is opened by manual operation of the graduating piston 62, fluid pressure will be substantially simultaneously conducted to the primary and secondary braking circuits. Preferably, the relay elements 38 and 46 have motive areas of substantially equal size and the loading the spring systems in the primary and secondary circuits are of substantially the same value. Thus, the primary and secondary braking circuits will be substantially simultaneously charged with substantially equal pressures so that any pressure differential between the two braking circuits is substantially eliminated.

As soon as the desired braking pressure is attained in the braking circuits, further movement of the graduating piston 62 is arrested, whereupon the fluid pressure in the primary relay cavity 58 acting on the lower surface of the piston 62 will move the latter upwardly to compress the rubber graduating spring 72. Such upward movement will continue until the third valve element is returned to its closed position against the partition 16. When this occurs, further supply of fluid pressure to the relay cavities 54 and 58 will be cut off and the respective relay members 38 and 46 will move upwardly so that the respective valves 22 and 24 controlled thereby will assume lapped positions in a manner well known in the art. When manual force on piston 62 is decreased, the lower end of extension 74 is raised clear of the exhaust opening 55 thereby exhausting to atmosphere fluid pressure from the upper sides of relay pistons 38, 46 which are then raised to the positions of the closing by their respective springs 40, 48 to connect delivery cavities 25, 30 to atmosphere by way of aligned bores 80, 82, 84 whereupon the parts assume the positions illustrated and fluid pressure is exhausted from the primary and secondary braking circuits.

In the event of failure of the fluid pressure supply in the primary circuit, the secondary circuit will nevertheless be functional. This will readily be apparent due to the abutment 86 which will engage the stem 76 to manually move the secondary relay element downwardly to open to valve member 24. The valve will lap in accordance with pedal effort when the pressure force under the piston 46 balances the downward pedal force on the rubber graduating spring 72. In the event of failure of fluid pressure in the secondary circuit, fluid pressure in the secondary relay chamber 54 will move the relay element downwardly until the spring 34 goes solid in which event fluid pressure in the primary relay chamber 58 will operate the valve member 22 in the usual manner.

It will be readily apparent from the foregoing that the present invention provides a novel dual brake valve wherein the primary and secondary control valves are controlled by respective relay elements which are simultaneously supplied with fluid pressure from one of the supply circuits by manual operation of a separate control valve. In this manner, each circuit is simultaneously supplied with equal pressures, thus eliminating the possibility of creating a pressure differential in the primary and secondary braking circuits.

What is claimed is:

1. In a dual circuit brake valve having a housing including first and second sets of inlet and delivery ports, and first and second normally closed valve members for controlling the flow of fluid pressure between the respective inlet and delivery ports, the invention which comprises means for simultaneously moving said normally closed valve members to open position comprising a first fluid pressure responsive relay element in said housing for controlling the opening of the first valve member, a second fluid pressure responsive relay element in said housing for controlling the opening of the second valve member, a fixed partition in said housing provided with an opening, means including a third valve member for controlling said opening and simultaneously communicating one of said inlet ports with both of said relay elements to effect simultaneous opening of said first and second valve members, and a manually operable member for controlling the operation of said third valve member.

2. The dual circuit brake valve of claim 1 wherein the fluid pressure responsive relay elements have motive areas of equal size.

3. The dual circuit brake valve of claim 1 wherein the third valve member simultaneously communicates the first inlet port with both of said relay elements.

4. The dual circuit brake valve of claim 3 wherein said manually operable member includes a graduating piston subject to the fluid pressure at the first inlet port when the third valve member is open.

5. The dual circuit brake valve of claim 4 which includes a first delivery cavity beneath the first relay element and communicating with the first delivery port and a second delivery cavity beneath the second relay element and communicating with the second delivery port.

6. The dual circuit brake valve of claim 3 wherein said manually operable member includes means to positively move the second valve member to open position in the event of failure of fluid pressure at the first inlet port.

7. The dual circuit brake valve of claim 3 wherein the partition divides the housing into an upper chamber communicating with the first inlet port and a lower chamber communicating with the second inlet port.

8. The dual circuit brake valve of claim 7 wherein the second relay element is positioned in the lower chamber and spaced from said partition to provide a cavity communicating at all times with the first relay element.

9. The dual circuit brake valve of claim 8 wherein the third valve member normally closes the opening in the partition to interrupt communication between said cavity and the upper chamber.

10. The dual circuit brake valve of claim 9 wherein the relay elements and the first, second and third valve members are coaxially arranged in the housing.

* * * * *